Figure 1:
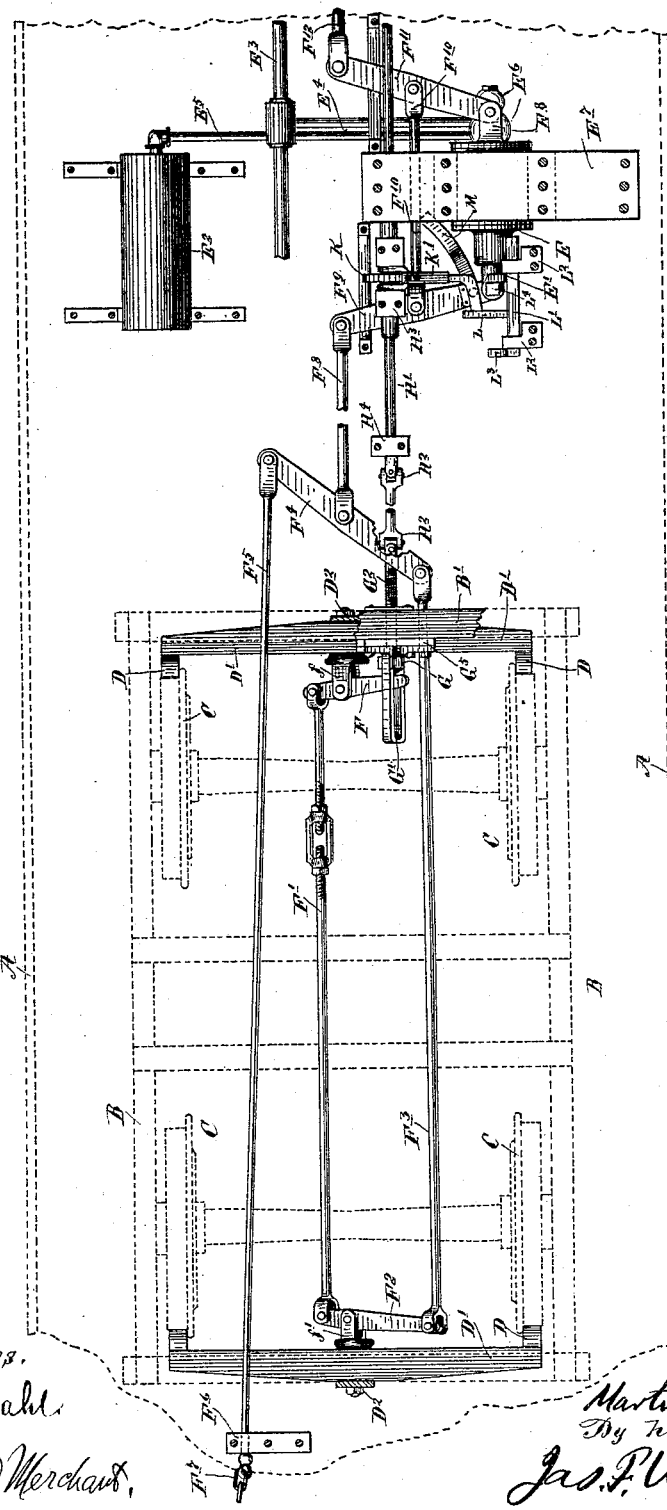

(No Model.) 3 Sheets—Sheet 1.

M. E. McKEE.
AUTOMATIC BRAKE ADJUSTER.

No. 487,636. Patented Dec. 6, 1892.

Witnesses.
A. H. Opsahl.
Frank D. Merchant.

Inventor
Martin E. McKee
By his Attorney.
Jas. F. Williamson (No Model.) 3 Sheets—Sheet 2.
M. E. McKEE.
AUTOMATIC BRAKE ADJUSTER.
No. 487,636. Patented Dec. 6, 1892.
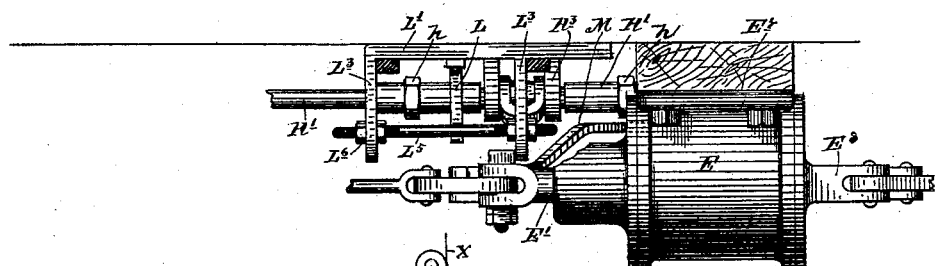
*Fig. 2*
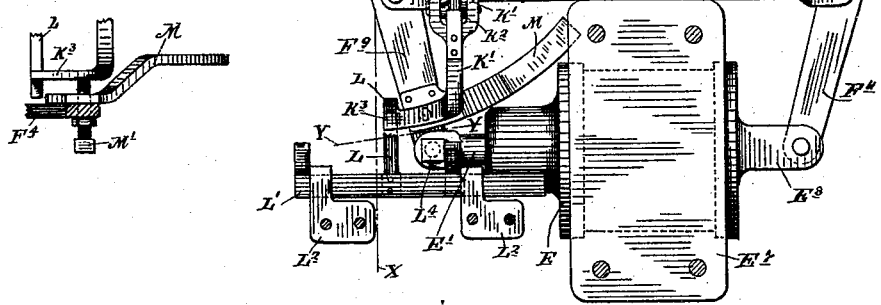
*Fig. 5*  *Fig. 3*
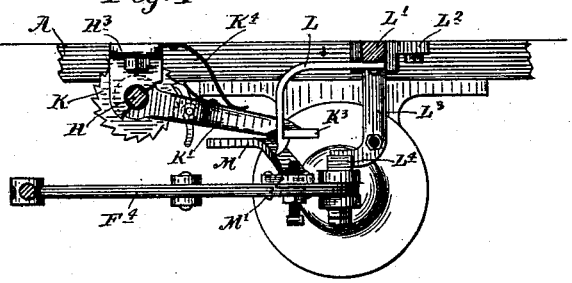
*Fig. 4*
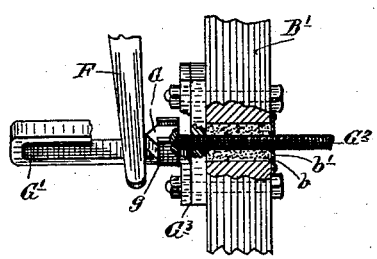
*Fig. 6.*
Witnesses.
A. H. Opsahl
Frank D. Merchant
Inventor.
Martin E. McKee
By his Attorney.
Jas. F. Williamson
THE NORRIS PETERS CO., PHOTO-LITHO., WASHINGTON, D. C.

(No Model.)  M. E. McKEE.  3 Sheets—Sheet 3.
AUTOMATIC BRAKE ADJUSTER.

No. 487,636. Patented Dec. 6, 1892.

Witnesses
A. H. Opsahl.
Frank D. Merchant.

Inventor
Martin E. McKee
By his Attorney
Jas. F. Williamson

UNITED STATES PATENT OFFICE.

MARTIN E. McKEE, OF ST. PAUL, MINNESOTA.

AUTOMATIC BRAKE-ADJUSTER.

SPECIFICATION forming part of Letters Patent No. 487,636, dated December 6, 1892.

Application filed May 19, 1892. Serial No. 433,523. (No model.)

*To all whom it may concern:*

Be it known that I, MARTIN E. MCKEE, a citizen of the United States, residing at St. Paul, in the county of Ramsey and State of Minnesota, have invented certain new and useful Improvements in Automatic Brake-Adjusters; and I do hereby declare the following to be a full, clear, and exact description of the invention, such as will enable others skilled in the art to which it appertains to make and use the same.

My invention relates to brakes, and is in the nature of an automatic compensating device or brake-adjuster for taking up the slack produced by the wear and tear on the brake-shoes. It will also take up the slack produced by the wear and tear in the brake-operating connection; but this is simply incidental to its main purpose.

The invention is capable of general application to many classes of brakes, but is especially designed for railway air-brakes.

As is well known, the brake-shoes in railway-brakes are made relatively of soft metal as compared with the wheels and wear away very rapidly under the service. It is also a well-known fact that it is desirable to set the brakes under uniform pressure, or, more accurately stated, to have the same so arranged that they may always be set to a maximum pressure. To accomplish this result, it is desirable to have the auxiliary reservoir on the car charged at a constant pressure and to have the piston of the air-brake maintain a substantially-uniform length of stroke; otherwise, if the piston movement be increased while the pressure remains uniform in the reservoir, the braking power will be decreased by the expansion. The slack produced by wear and tear on the brake-shoes from the time they are new until worn out is from six to eight inches, measured on the piston-stroke. This amount of variation cannot be taken up by the increase of the piston-stroke without rendering the brake insufficient and unreliable on account of the decreased power.

It is the object of my invention to provide automatic mechanism for taking up the slack thus incurred by the wear of the brake-shoes, thereby maintaining an approximately-uniform stroke of the piston. To this end I provide a take-up device and operate the same by means of automatic mechanism arranged either to take up the slack whenever it occurs or whenever it reaches an extent that would otherwise impair the braking power from the air-brake apparatus.

In a general way it may be stated that I take up the slack in the preferred form of my construction by shifting the base of resistance to the "dead-levers" of the brake-rigging by means of mechanism operated directly or indirectly from the prime mover of the air-brake system. I do not, however, limit myself to the use of the device in connection with brake-riggings wherein dead-levers are employed, inasmuch as the invention may be readily applied to other systems.

In the accompanying drawings I have illustrated my invention as applied in connection with the Westinghouse system of air-brake apparatus and the Hodge system of "brake-rigging."

Figure 8:
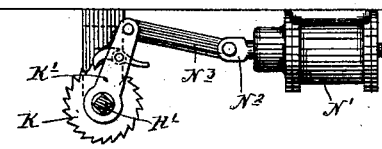
Figure 7:
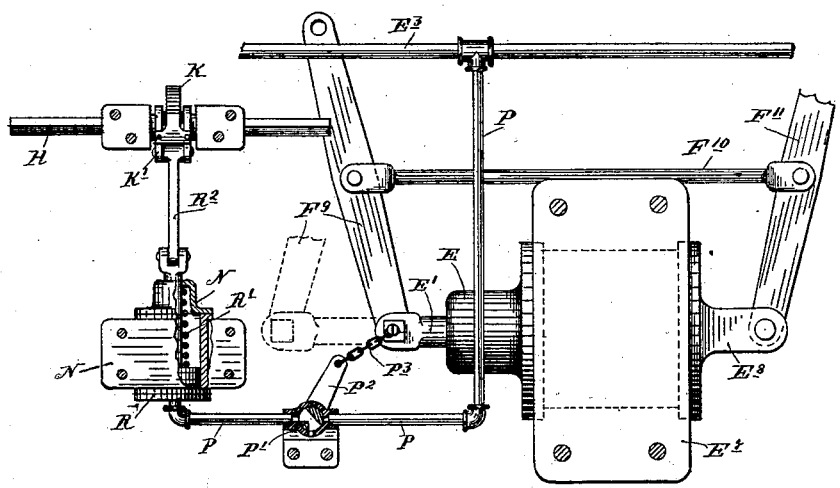
Figure 9:
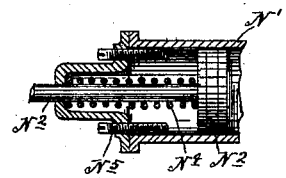

In the drawings, like letters referring to like parts throughout, Figure 1 is a plan view showing the invention as applied in use on railway-cars, a portion of the car-body and one of the trucks being represented in dotted lines only. Figs. 2 and 3 are respectively a side elevation and a plan view illustrating one form of the automatic mechanism for operating the take-up device, the car-body in both cases being removed. Fig. 4 is a transverse vertical section on the line X X' of Fig. 3, looking from the left toward the right with reference to Figs. 1, 2, and 3. Fig. 5 is a detail showing a portion of the ratchet-operating devices, the view being a section on the line Y Y' of Fig. 3. Fig. 6 is a detail showing one of the take-up devices proper as applied to the dead-lever, some parts being broken away. Fig. 7 is a plan view similar to Fig. 3, showing a modified construction of a part of the automatic mechanism for operating the take-up device from the prime mover of the brake system. Fig. 8 is a left end elevation of the mechanism shown in Fig. 7, some parts being removed and some broken away; and Fig. 9 is a detail in section of the ratchet-actuating motor shown in Fig. 7.

A represents in dotted lines the position of the car-body, B a part of one of the truck-frames, and C the truck-wheels.

B' represents in full lines a part of the inner cross-beam of the truck-frame.

D are the brake-shoes; D', the brake-beams, and $D^2$ the retracting-springs, which normally hold the shoes out of contact with the wheels.

Having regard to the motive-power appliances, E is the cylinder and E' the piston of the air-motor. $E^2$ is the auxiliary or storage reservoir; $E^3$, the main supply-pipe; $E^4$ and $E^5$, the circulating-pipes, the former from the supply-pipe and the latter from the reservoir, in communication with each other and the cylinder of the motor through suitable valve mechanism $E^6$; and $E^7$, the bearing for the cylinder, all of the well-known standard Westinghouse construction.

Having regard to the brake-rigging, F is the dead-lever pivoted to the inner brake-beam, as shown at $f$, and having its free end working against an adjustable base of resistance, which is supported from the inner truck-beam B', as will later appear. F' is a connecting-rod from the power end of the dead-lever to the weight end of the "live-lever" $F^2$, pivoted to the outer brake-beam, as shown at $f'$. $F^3$ is a connecting-rod from the power end of the lever $F^2$ to the outer end of the floating lever $F^4$, and $F^5$ is the resistance-rod from the inner end of the floating lever to the resistance-block $F^6$, fixed to the car-body and connected at its outer end by chain $F^7$ to the hand-brake. (Not shown.) $F^8$ is the main brake-rod connecting the floating lever with the inner end of the primary brake-lever $F^9$, which is directly connected at its outer end to the piston-rod or prime mover of the air-brake motor. A tie-rod $F^{10}$ connects the primary brake lever $F^9$ with a twin-lever $F^{11}$, which is pivoted at its outer end to a projecting lug $E^8$ from the rear end of the motor and is connected at its inner end to the twin brake-rod $F^{12}$ for operating the duplicate parts of the brake-rigging to the other truck. (Not shown.) The construction and operation of these motive-power appliances and of this brake-rigging are well known, and further description of the same is deemed unnecessary for the purposes of this case. It is obvious that whenever the piston or prime mover of the air-motor is moved outward the brakes will be set.

I will now give a detailed description of my attachment. The free end of the dead-lever F works in a yoke G', fixed to the inner cross-beam B' of the truck-frame, and the resistance-block G also works in the slot of this yoke as a guide and is held from lateral displacement by flanges $g$, embracing the body of the yoke. The resistance-block is wedge-shaped on its outer face and bears with the angle of the wedge directly against the free end of the dead-lever. A screw-threaded push-rod $G^2$ works through a screw-threaded nut or plate $G^3$, fixed to the outer face of the truck-beam B', and has its outer end working in contact with the back of the resistance-block G. It is evident that by turning this push-rod $G^2$ in the fixed nut-plate the resistance-block may be moved outward along the yoke G' as a guide, and will thus take up the slack. The rod $G^2$ is connected with a sectional shaft consisting of section H, mounted against endwise movement in fixed bearings $H^3$, depending from the bottom of the car, the section H' mounted with freedom for a sliding movement, and the knuckle-joint section $H^2$ connecting the same with the rod $G^2$. The sliding section H' is mounted in a bearing-block $H^4$, depending from the car-body. The part of the section H which projects beyond its bearings is square in cross-section and fits a correspondingly-formed socket in the inner end of the section H'. This connection forms a telescoping joint between the sections H and H', while permitting their rotary motion to be effected by a wrench-like action. The parts extending to the resistance-block on the opposite truck (not shown) are duplicates of the parts just noted in all respects, except that the thread on the push-rod $G^2$ is left-handed instead of right. The central or longitudinally-fixed section H of this sectional shaft has rigidly secured thereto a ratchet-wheel K between the bearing-blocks $H^3$ and is embraced by the prongs of a ratchet-lever K', loosely pivoted on the shaft and provided with the spring-held pawl $K^2$, engaging the teeth of the ratchet-wheel. As shown in Figs. 1, 2, 3, and 4, this ratchet-lever extends outward toward the side of the car and terminates in a forwardly-extended segment-shaped stop-arm $K^3$, which is normally held up against the tension of a flat spring $K^4$ by a spring latch-finger L, carried by an idle-plunger L', mounted in keepers $L^2$, secured to the bottom of the car. This idle-plunger L' is mounted for movement substantially parallel with the piston of the air-motor and has downwardly-projecting lugs or feet $L^3$, spaced apart from each other and standing in the path of the head of the bolt $L^4$, which connects the piston-rod with the primary brake-lever $F^9$. Normally this bolt-head $L^4$ will engage the inner right-hand member of these projecting feet on the idle-plunger at the limit of its inward stroke, holding the plunger and the latch-finger carried thereby at the extreme right. The distance between the two feet of the idle-plunger L' is such that the piston-bolt will not engage the outer or left end foot under the normal outward stroke of the piston, or in any event that it will not under the normal outward stroke of the piston move the plunger sufficiently far to carry the latch-finger out from under the stop-arm of the ratchet-lever. Whenever the wear on the brake-shoes becomes sufficiently great to require the piston to make a stroke in excess of its normal limit, the plunger will then be moved outward by the piston-bolt sufficiently far to unlatch the free end of the ratchet-lever. The free end of the ratchet-lever will then rest with its stop-arm portion $K^3$ on the raised part of a cam-lever M, carried by the primary brake-lever $F^9$. A set-screw $M'$ is also carried by the primary brake-lever at the forward end of the said cam-arm. At the return movement of the piston, after the release of the ratchet-lever, the cam-arm M will be carried backward therewith and permit the ratchet-lever to be thrown down by its retracting-spring $K^4$ onto the top of the set-screw $M'$. This will give the throw to the pawl of the ratchet-lever on the ratchet-wheel K, and at the next following outward movement of the piston at the initial part of the stroke the cam-arm will lift the ratchet-lever and turn the sectional shaft and through the same, and the screw-threaded push-rods $G^2$ will force outward the resistance-blocks G, thus taking up the slack. This occurs and is completed before the completion of the outward stroke of the piston and before the brake-shoes are set. This lifting movement on the ratchet-lever by the cam-arm relatches the free end of the ratchet-lever to the spring-latch L, which will then hold it in its normal position. On the return movement of the piston at the previous stroke the plunger is thrown backward into its normal position, so as to bring the latch-finger L into its proper position for engaging the stop-arm of the ratchet-lever when lifted by the cam-arm, as described. The amount of slack which will be taken up at each stroke of the ratchet-lever may be varied at will by the set-screw $M'$. The feet or lugs on the idle-plunger will be correspondingly spaced apart, so that the piston will actuate the same to trip the ratchet-lever at the corresponding desired limit of variation in the piston-stroke. In practice this variation of the normal stroke of the piston is preferably limited to about one-half inch. Hence whenever there is sufficient wear on the shoes to produce slack amounting to half an inch or more on the piston-stroke the ratchet-lever will be tripped into action and the slack will be automatically taken up. This maintains the pressure from the air-motor at the uniform standard of maximum efficiency. It should be noted that the telescoping connection between the longitudinally-fixed section H and the sliding section $H'$ of the sectional shaft not only permit the sliding action of the section $H'$ to effect the outward movement of the resistance-block, but also permits a slight telescoping movement of the same under the vibratory and oscillatory motions of the car. As a matter of preference, the screw-threaded push-rods $G^2$ work through an oil-box formed by cutting out the truck-beam and filling the same with a suitable packing $b$, which is held in place by the nut-plate on one side and a cap $b'$ at the other. This keeps the push-rods lubricated. The feet $L^3$ on the trip-plunger $L'$ may be sprung by tie-rod $L^5$ and jam-nuts $L^6$ to adjust the normal limit of variation permitted to the piston-stroke before operating the brake-adjuster.

In the modification illustrated in Figs. 7, 8, and 9 I substitute a small air-motor for operating the ratchet-lever and control the same from a prime mover of the brake-motor by means of a valve in the air-supply pipe to the ratchet-motor. The ratchet-lever is in this modification cut short and works over the top instead of at the side of the ratchet-wheel. The ratchet-motor is suitably secured to the bottom of the car by a bearing-block N, and has its cylinder $N'$ in communication with the main supply-pipe $E^3$ through a branch pipe P and a three-way cock $P'$. The valve of this three-way cock is provided with a lever $P^2$, which is united by a flexible connection—such as a chain $P^3$—with the outer end of the piston-rod of the air-brake motor. The piston $N^2$ of the ratchet-actuating motor is connected by a link $N^3$ to the ratchet-lever and works against a retracting-spring $N^4$, encircling the piston-rod within the cylinder. When the piston-rod of the air-brake motor is in its innermost position, the valve in the three-way cock $P'$ is open to exhaust from the ratchet-motor and closes the branch supply-pipe $P^2$, containing the air under pressure. The chain $P^3$ has sufficient slack to permit the piston of the brake-motor to make its normal stroke, together with the limit of variation, without operating the valve in the three-way cock. When this variation is exceeded, the valve-lever will be rocked, closing the exhaust from the ratchet-actuating motor and opening the supply-pipe P to permit the air under pressure to enter the cylinder $N'$ and impart a stroke to the piston $N^2$ and the ratchet-lever after the brakes are released. This will operate the sectional shaft and force the resistance-blocks outward and take up the slack the same as in the other construction. The stroke of the piston $N^2$ of the ratchet-operating motor is determined and varied at will by set-screws $N^5$, projecting into the cylinder $N'$ into the path of the piston. This of course determines the amount of slack to be taken up at one stroke of the ratchet, and the amount of variation to be permitted to the piston of the air-motor before operating the take-up mechanism is determined and limited by the amount of the slack in the chain $P^3$. This will be arranged so as to throw the ratchet-operating motor into action whenever the stroke of the piston of the brake-motor exceeds a variation of one-half inch. Hence the same result will be accomplished as in the other construction—to wit., the slack will be taken up whenever necessary to compensate for the wear on the brake-shoes, so as to maintain the standard efficiency and pressure from the brake-motor.

Having reference to both forms of the compensating mechanism, it is obvious that the ratchet-operating mechanism might be arranged to be operated at each stroke of the piston of the brake-setting motor. In that event the amount of wear would have to be predetermined by estimate or experience for each setting of the brakes. The construction shown in Figs. 1, 2, 3, 4, and 5 would operate in this way, if the idle-plunger and the latch-finger were omitted. All that would be necessary to make the modification shown in Figs. 7 to 9, inclusive, operate in this way would be to decrease the amount of the slack accordingly in the chain $P^3$ and shorten the stroke of the ratchet-operating piston $N'$ by adjusting the set-screws $N^5$.

By actual usage I have demonstrated the practicability of my invention herein shown and described.

When the old brake-shoes are worn out and new shoes substituted, the sliding sections of the sectional shafts are returned to their initial positions on the longitudinally-fixed section by lifting the ratchet-pawl and applying a wrench to either of the wrench-surfaces $h$, carried by the sliding sections.

My inventions will work equally well in other forms of brake-rigging and with other systems of motive-power appliances.

The words "ratchet mechanism" as herein employed are used in a broad sense to cover any form of mechanism having a driving and a driven member, wherein the driving member operates the driven member when moving in one direction and does not operate the driven member when moving in the other direction. Ordinarily in ratchet mechanisms the driving member slips over the driven member on the return movement, but it might be arranged to be thrown entirely out of contact therewith on the said return movement.

What I claim, and desire to secure by Letters Patent of the United States, is as follows:

1. In an air-brake system, the combination, with the brake-rigging and the brake-setting motor, of a movable resistance-block applied to the dead lever, a screw-threaded push-rod working through a fixed nut against the said block, and ratchet mechanism applied to operate said push-rod under the control of the movable part of the brake-setting motor.

2. In the system of railway-brakes substantially as shown and described, the combination, with the movable resistance-blocks applied to the dead-levers of the brake-rigging, of the screw-threaded push-rods, the sectional shaft connected to said push-rods and united with a telescoping and wrench-acting joint and having one of its sections fixed against longitudinal movement, the ratchet carried by said longitudinally-fixed section, the ratchet-lever working on said ratchet-wheel, the brake-setting motor, and mechanism controlled thereby for operating the said ratchet, substantially as and for the purpose set forth.

3. The combination, with a brake-rigging, of a fixed yoke embracing the free end of the dead-lever, a resistance-block movable on said yoke as a guide against the free end of said lever, a fixed nut-plate, and a screw-threaded push-rod working through said nut-plate for taking up slack produced by wear and tear on the shoes or in the rigging, substantially as described.

4. In a car-brake, the combination, with a brake-rigging arranged to operate the brakes of both trucks, of a pair of movable resistance-blocks applied to the two dead-levers of the brake-rigging, corresponding pairs of fixed nuts, a corresponding pair of screw-threaded push-rods with oppositely-cut threads working through said nuts against said resistance-blocks, and a sectional operating-shaft having a central section fixed against endwise movement, and a pair of sliding sections, one for each of said push-rods united to said fixed sections with a telescoping and wrench-acting joint, whereby rotation of the shaft will move the resistance-blocks in opposite directions, substantially as and for the purpose set forth.

5. In an air-brake, the combination, with a brake-setting motor and a brake-rigging, of a take-up device applied to said rigging for taking up the slack produced by the wear on the brake-shoes, a ratchet mechanism for operating the said take-up device, a cam controlled from said motor and applicable to the driving member of said ratchet mechanism, a detent normally preventing the cam action, and a trip controlled from said motor to release the said detent and render the cam active, the said cam being constructed and adapted to operate upon said driving member of the ratchet mechanism when active during the initial part of the brake-setting movement of the parts, whereby the slack will be taken up by a positive action and at a time during the brake-setting action before the brake-shoes are moved into contact with the wheels, substantially as and for the purpose set forth.

6. In an air-brake, the combination, with the fixed yokes and movable resistance-blocks applied to the dead-levers of the brake-rigging, of the fixed nut-plates, the right and left screw-threaded push-rods working through said nut-plates against said resistance-blocks, the push-rod operating-shaft having a central section fixed against endwise movement and a pair of sections united thereto with a telescoping and wrench-acting joint, the ratchet-wheel and ratchet-lever applied to said central section of the push-rod-operating shaft, the brake-motor, and devices under the control of the movable part of the motor for operating said ratchet-lever whenever required to take up the slack produced by wear on the brake-shoes.

7. The combination, with a brake-motor and a brake-rigging, of a take-up device applied to said rigging, a ratchet mechanism for operating said take-up device, and a movable cam controlled from the movable part of the motor for operating said ratchet mechanism.

8. In an air-brake, the combination, with a brake-setting motor and a brake-rigging, of a take-up device applied to said rigging for taking up the slack produced by wear on the brake-shoes, a ratchet mechanism for operating said take-up device, a cam controlled from said motor and applicable to the driving member of said ratchet mechanism, a detent normally preventing the cam action, and a trip controlled from said motor to release the said detent and render the cam active, substantially as described.

9. In an air-brake, the combination, with a brake-motor and a brake-rigging, of a take-up device applied to said rigging, a ratchet-wheel and ratchet-lever for operating the take-up device, a movable cam-arm applicable to said ratchet-lever, and a movable trip-plunger provided with a detent normally holding the ratchet-lever inoperative by the said cam-arm, the said cam-arm and plunger both being under the control of the movable part of the motor, substantially as described.

10. In an air-brake, the combination, with the air-motor and the brake-rigging, of the movable resistance-blocks G, the guide-yokes G', the push-rods $G^2$, working through fixed nuts $G^3$, the sectional shaft H H' $H^2$, having its parts arranged as described, the ratchet-wheel K, fixed to shaft-section H, the ratchet-lever K', with spring-pawl $K^2$, stop-arm $K^3$, and the retracting-spring $K^4$, the cam-arm M, and set-screw M' on the primary brake-lever, and the trip-plunger L', carrying the latch-finger or detent L and provided with the lugs or feet $L^3$ in the path of a projection on the motor-piston, all arranged and operating substantially as described, and for the purpose set forth.

In testimony whereof I affix my signature in presence of two witnesses.

MARTIN E. McKEE.

Witnesses:
JAS. F. WILLIAMSON,
FRANK D. MERCHANT.